O. A. REED.
ENGINE VALVE.
APPLICATION FILED MAR. 1, 1911.

1,172,556.

Patented Feb. 22, 1916.
3 SHEETS—SHEET 1.

Witnesses:
Samuel W. Balch
Frank C. Cole

Inventor,
Oliver A. Reed,
by Thomas Ewing, Jr.,
Attorney.

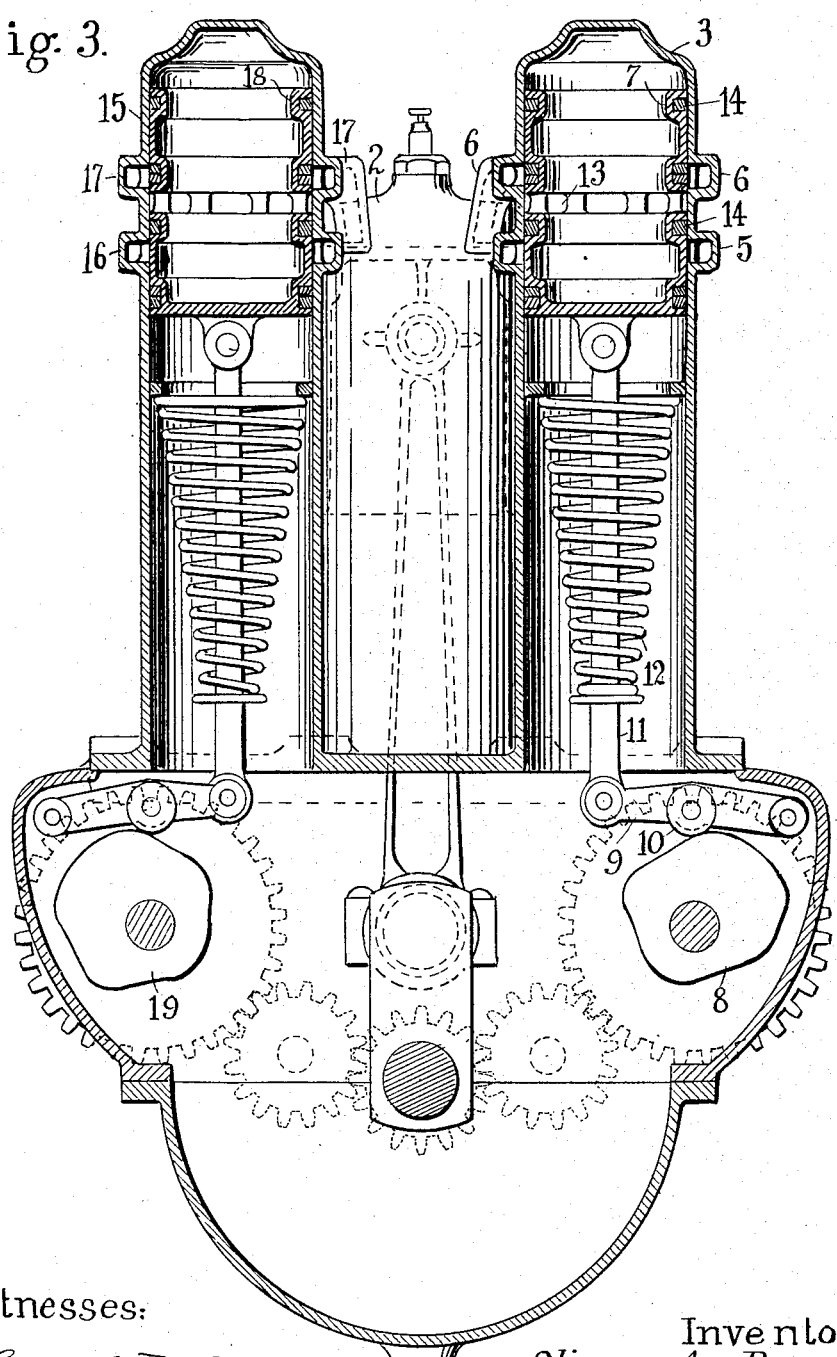

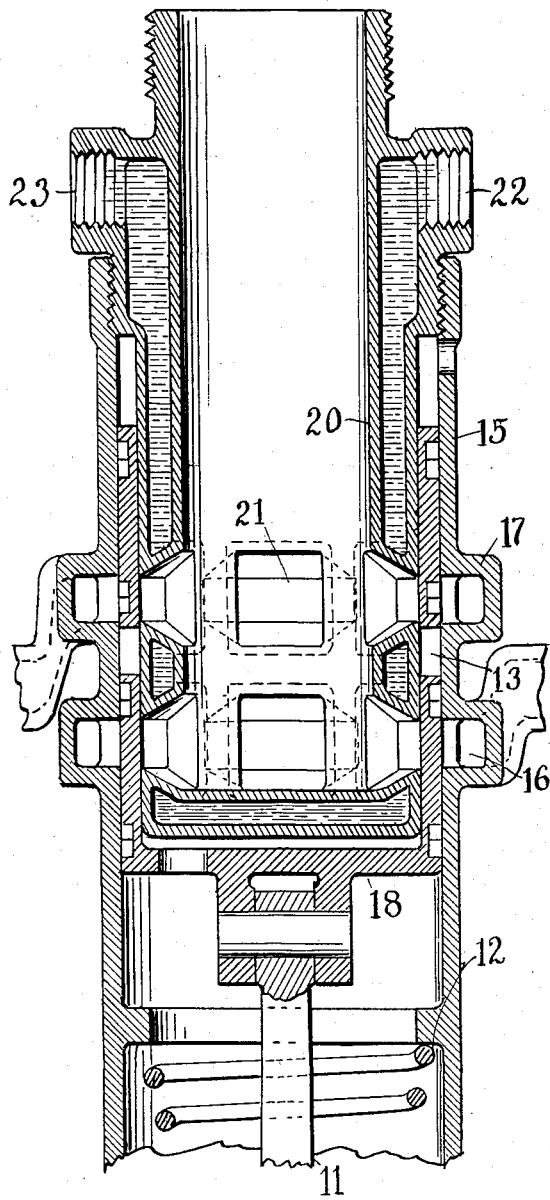

UNITED STATES PATENT OFFICE.

OLIVER A. REED, OF PLAINFIELD, NEW JERSEY.

ENGINE-VALVE.

1,172,556.  Specification of Letters Patent.  Patented Feb. 22, 1916.

Application filed March 1, 1911. Serial No. 611,684.

*To all whom it may concern:*

Be it known that I, OLIVER A. REED, a citizen of the United States of America, and a resident of Plainfield, county of Union, and State of New Jersey, have invented certain new and useful Improvements in Engine-Valves, of which the following is a specification.

The object of this invention is to provide a valve constructed to serve ports of two power cylinders of an engine and to further organize the engine with two such valves in which one controls the inlet ports of the two power cylinders and the other controls the exhaust ports of the two power cylinders.

A further object of the invention is to provide a valve wherein all the ports over which the valve operates are either all inlet ports, or all exhaust ports, so that there will be no inequalities of expansion tending to distort and unseat the valve.

Figure 1:
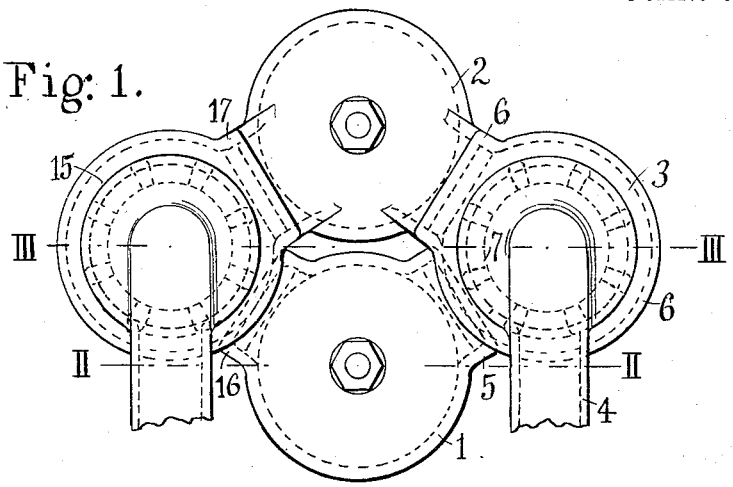
Figure 2:
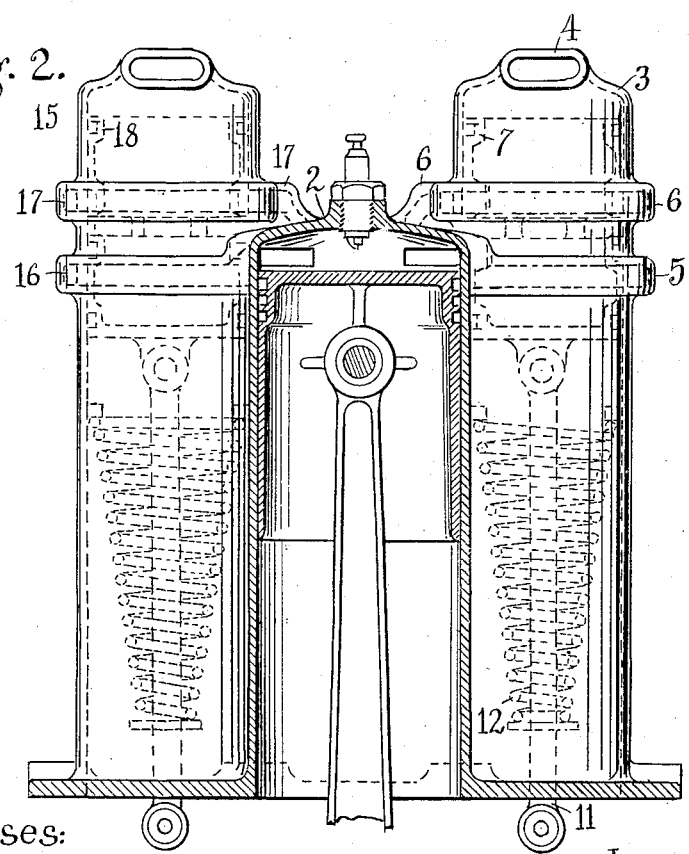

In the accompanying three sheets of drawings which form a part of this application—Figure 1 is a plan showing the upper ends of two power cylinders of an explosive engine, with associated valves embodying my invention, Fig. 2 is a section through one of the power cylinders on the line II—II of Fig. 1 and elevation of the valve cylinders. Fig. 3 is a section through the valve cylinders and crank case on the line III—III of Fig. 2 and an elevation of the rearward power cylinder. Fig. 4 is a section to an enlarged scale through the exhaust valve cylinder, showing a construction for cooling the cup valve.

The engine shown is of the four-cycle type, with a forward power cylinder 1 and a rearward power cylinder 2, but the engine as a whole is not limited to two power cylinders, as others may be added to secure balance of reciprocating parts and further equalize the power. The power cylinders as shown are connected to the same crank and make their strokes at the same time, but this is not essential. They are preferably fired alternately.

The charge is admitted through an inlet valve cylinder 3 being delivered to this cylinder through a pipe 4. Surrounding the valve cylinder and communicating with the forward power cylinder is a port 5 and above this port is a second port 6 which communicates with rearward power cylinder. A piston cup valve 7 is mechanically operated in the valve cylinder from a cam 8 through a lever 9 which carries a cam roller 10 and connects with the valve through a rod 11. The downward movement of the valve is insured by a spring 12 when the form of cam is such as to render this necessary. The cup valve is provided with a port 13 which is brought into register with the port to the forward power cylinder when the valve is at the lower limit of its stroke and which is brought into register with the port to the rearward power cylinder when the valve is at the upper limit of its stroke, or vice versa. The valve in other positions closes these ports to the power cylinders and is provided with packing rings 14 14 which prevent leakage. The exhaust valve cylinder 15 is located on the opposite side of the pair of power cylinders from the inlet valve cylinder and is connected with the power cylinders by ports 16 and 17 in the same way and is provided with a mechanically operated cup valve 18 of the same construction. This valve is operated from a cam 19 properly shaped to open the valves at the proper time.

In the form shown in Fig. 4 an exhaust head 20 projects from the top of the exhaust valve cylinder within the cup valve and has ports 21 21 which register with the port of the cup valve when the port of the valve is in register with either of the ports of the valve cylinder. This exhaust head is water-jacketed, the water being circulated through an inlet 22 and an outlet 23. The exhaust head protects the interior of the valve from the heated gases and the cup valve slides between cooled walls. The customary water-jacketing outside of the power cylinders and exhaust valve cylinder is not shown and will be readily understood and employed where air-cooling is insufficient.

I do not limit my invention to the operation of the valves by means of cams as any suitable valve operating mechanism may be substituted therefor.

What I claim as new and desire to secure by Letters Patent of the United States is—

1. In an engine, the combination of two power cylinders, a mechanically operated reciprocating inlet valve, an inlet port between the valve and each power cylinder, the valve being constructed to open the inlet port of one power cylinder when in one position and to open the inlet port of the other power cylinder when in another position, substantially as described.

2. In an engine, the combination of two power cylinders, a mechanically operated reciprocating inlet valve and a mechanically operated reciprocating outlet valve, separate ports between each valve and each power cylinder, the inlet valve being constructed to open the inlet port to one power cylinder when in one position and to open the inlet port to the other power cylinder when in the other position, and the outlet valve being constructed to open the outlet port to one power cylinder when in one position and to open the outlet port to the other power cylinder when in the other position, substantially as described.

3. In an engine, the combination of two power cylinders, a pipe, a valve cylinder, separate ports between the valve cylinder and each power cylinder, and a mechanically operated piston valve constructed to connect the port of one power cylinder with the pipe when in one position and to connect the port of the other power cylinder with the pipe when in another position, substantially as described.

4. In an engine, the combination of two power cylinders, an inlet valve cylinder, an outlet valve cylinder, separate ports between each valve cylinder and each power cylinder, a mechanically operated piston valve in the inlet valve cylinder constructed to open the inlet port to one power cylinder when in one position and to open the inlet port of the other power cylinder when in another position, and a mechanically operated piston valve in the outlet valve cylinder constructed to open the outlet port to one power cylinder when in one position and to open the outlet port of the other power cylinder when in another position, substantially as described.

5. In an engine, the combination of two power cylinders, a pipe, a valve cylinder, separate ports between the valve cylinder and each power cylinder, and a piston valve provided with a port which registers with the port of one power cylinder and connects the port to the pipe when in one position and which registers with the port of the other power cylinder and connects the port to the pipe when in another position, substantially as described.

6. In an engine, the combination of two power cylinders, an inlet valve cylinder, an outlet valve cylinder, separate ports between each valve cylinder and each power cylinder, a piston in the inlet valve cylinder provided with a port which registers with the inlet port of one power cylinder when in one position and which registers with the inlet port of the other power cylinder when in another position, and a piston in the outlet valve cylinder provided with a port which registers with the outlet port of one power cylinder when in one position and which registers with the outlet port of the other power cylinder when in another position, substantially as described.

7. In an engine, the combination of two power cylinders, a pipe, a valve cylinder, separate ports between the valve cylinder and each power cylinder, and a mechanically operated piston valve constructed to connect the port of one power cylinder with the pipe when at one end of the stroke and to connect the port of the other power cylinder with the pipe when at the other end of the stroke, substantially as described.

8. In an engine, the combination of two power cylinders, an inlet valve cylinder, an outlet valve cylinder, separate ports between each valve cylinder and each power cylinder, a mechanically operated piston valve in the inlet valve cylinder constructed to open the inlet port of one power cylinder when at one end of the stroke, and to open the inlet port of the other power cylinder when at the other end of the stroke, and a mechanically operated piston valve in the outlet valve cylinder constructed to open the outlet port of one power cylinder when at one end of the stroke, and to open the outlet port of the other power cylinder when at the other end of the stroke, substantially as described.

9. In an engine, the combination of two power cylinders, a pipe, a valve cylinder, separate ports between the valve cylinder and each power cylinder, and a mechanically operated piston valve provided with a port which registers with the port of one power cylinder and connects the port to the pipe when at one end of the stroke, and which registers with the port of the other power cylinder and connects the port to the pipe when at the other end of the stroke, substantially as described.

10. In an engine, the combination of two power cylinders, an inlet valve cylinder, an outlet valve cylinder, separate ports between each valve cylinder and each power cylinder, a mechanically operated piston valve in the inlet valve cylinder provided with a port which registers with the inlet port of one power cylinder when at one end of the stroke, and which registers with the inlet port of the other power cylinder when at the other end of the stroke, and a mechanically operated piston valve in the outlet valve cylinder provided with a port which registers with the outlet port of one power cylinder when at one end of the stroke, and which registers with the outlet port of the other power cylinder when at the other end of the stroke, substantially as described.

11. In an engine, the combination of two power cylinders, an inlet valve cylinder, an outlet valve cylinder, one inlet piston valve provided with but one inlet port that controls the opening and closing of the inlet port of each power cylinder on its admission piston stroke, and one outlet piston valve provided with but one outlet port that controls the opening and closing of the outlet port of each power cylinder on its exhaust piston stroke, substantially as described.

12. In an engine, the combination of two power cylinders, a valve cylinder, a separate port between the valve cylinder and each power cylinder, a piston valve provided with a port which registers with the port to one power cylinder when in one position and which registers with the port to the other power cylinder when in another position, and a water-jacketed head projecting within the valve and provided with ports which register with the port of the valve when the port of the valve is in register with either port of the valve cylinder, substantially as described.

Signed at Plainfield, N. J., this 27th day of February, 1911.

OLIVER A. REED.

Witnesses:
C. F. FULMER,
U. GRANT PIERSON.

Copies of this patent may be obtained for five cents each, by addressing the "Commissioner of Patents, Washington, D. C."